United States Patent
Lee et al.

(10) Patent No.: US 10,575,208 B2
(45) Date of Patent: *Feb. 25, 2020

(54) METHOD FOR TRIGGERING AND REPORTING A BUFFER STATUS AND DEVICE THEREFOR

(71) Applicant: LG ELECTRONICS INC., Seoul (KR)

(72) Inventors: Sunyoung Lee, Seoul (KR); Seungjune Yi, Seoul (KR); Sungjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,889

(22) Filed: Jan. 25, 2019

(65) Prior Publication Data

US 2019/0159060 A1 May 23, 2019

Related U.S. Application Data

(63) Continuation of application No. 15/986,277, filed on May 22, 2018, which is a continuation of application (Continued)

(51) Int. Cl.
*H04W 28/02* (2009.01)
*H04W 72/12* (2009.01)

(52) U.S. Cl.
CPC ... *H04W 28/0278* (2013.01); *H04W 72/1242* (2013.01); *H04W 72/1284* (2013.01)

(58) Field of Classification Search
None
See application file for complete search history.

(56) References Cited

U.S. PATENT DOCUMENTS

2006/0209869 A1 9/2006 Kim et al.
2006/0274690 A1 12/2006 Chun et al.
(Continued)

FOREIGN PATENT DOCUMENTS

CN 101547435 A 9/2009
EP 2343945 A2 7/2011
(Continued)

OTHER PUBLICATIONS

3GPP_TSG_RAN2_Meeting#83_R2-132583, "BSR Impacts for Bearer Split", Aug. 2013, all pages (Year: 2013).*
(Continued)

*Primary Examiner* — Chirag G Shah
*Assistant Examiner* — Srinivasa R Reddivalam
(74) *Attorney, Agent, or Firm* — Fish & Richardson P.C.

(57) ABSTRACT

A method for a user equipment (UE) operating in a wireless communication system including a first base station (BS) and a second BS. The UE includes two medium access control (MAC) entities: one MAC entity for the first BS and one MAC entity for the second BS. The method includes mapping a first logical channel group (LCG) including one or more logical channels for transmitting first data to the first BS to the one MAC entity for the first BS and a second LCG including one or more logical channels for transmitting second data to the second BS to the one MAC entity for the second BS; based on the first data belonging to a logical channel in the first LCG having a higher priority than priorities of other logical channels in the first LCG for which data is already available for transmission, triggering, by the one MAC entity for the first BS, a first buffer status report to the first BS independently of logical channels of the second LCG; and based on the second data belonging to a logical channel in the second LCG having a higher priority than priorities of other logical channels in the second LCG (Continued)

for which data is already available for transmission, triggering, by the one MAC entity for the second BS, a second buffer status report to the second BS independently of logical channels of the first LCG.

12 Claims, 14 Drawing Sheets

Related U.S. Application Data

No. 15/021,863, filed as application No. PCT/KR2014/008741 on Sep. 19, 2014, now Pat. No. 10,064,090.

(60) Provisional application No. 61/883,188, filed on Sep. 26, 2013.

(56) References Cited

U.S. PATENT DOCUMENTS

| | | | |
|---|---|---|---|
| 2009/0113058 A1 | 4/2009 | Ou et al. | |
| 2009/0113086 A1 | 4/2009 | Wu et al. | |
| 2010/0077100 A1* | 3/2010 | Hsu | H04W 72/1221 709/234 |
| 2011/0171967 A1 | 7/2011 | Lee et al. | |
| 2011/0274044 A1* | 11/2011 | Park | H04L 47/10 370/328 |
| 2012/0093121 A1* | 4/2012 | Zhang | H04W 72/1284 370/329 |
| 2012/0190376 A1* | 7/2012 | Rosa | H04W 72/1284 455/450 |
| 2014/0064219 A1 | 3/2014 | Quan et al. | |
| 2014/0177560 A1* | 6/2014 | Guo | H04W 72/1268 370/329 |
| 2014/0286266 A1 | 9/2014 | Sammour et al. | |
| 2015/0117342 A1* | 4/2015 | Loehr | H04W 72/1284 370/329 |
| 2015/0358838 A1* | 12/2015 | Wei | H04W 76/15 370/228 |

FOREIGN PATENT DOCUMENTS

| | | |
|---|---|---|
| JP | 2009-49580 A | 3/2009 |
| JP | 2011-142638 A | 7/2011 |
| JP | 2011-524713 A | 9/2011 |
| JP | 2015-520585 A | 7/2015 |
| RU | 2476026 C2 | 2/2013 |
| WO | WO 2009/097273 A1 | 8/2009 |
| WO | WO 2012/146210 A1 | 11/2012 |
| WO | WO 2013/116988 A1 | 8/2013 |

OTHER PUBLICATIONS

LG Electronics, "BSR Impacts by Bearer Split," 3GPP TSG-RAN2 Meeting #83, R2-132583, Barcelona, Spain, Aug. 19-23, 2013, pp. 1-4.
Renesas Mobile Europe, "On Protocol Stack Impacts of Dual Connectivity," 3GPP TSG-RAN WG2 Meeting #83, R2-132405, Barcelona, Spain, Aug. 19-23, 2013, 6 pages.
Samsung, "Framework for Buffer Status Reporting in Dual Connectivity," 3GPP TSG-RAN WG2 Meeting #84, R2-140248 (update of R2-133863), Prague, Czech, Feb. 10-14, 2014, pp. 1-5.
United States Office Action in U.S. Appl. No. 15/986,277, dated Apr. 1, 2019, 25 pages.

* cited by examiner

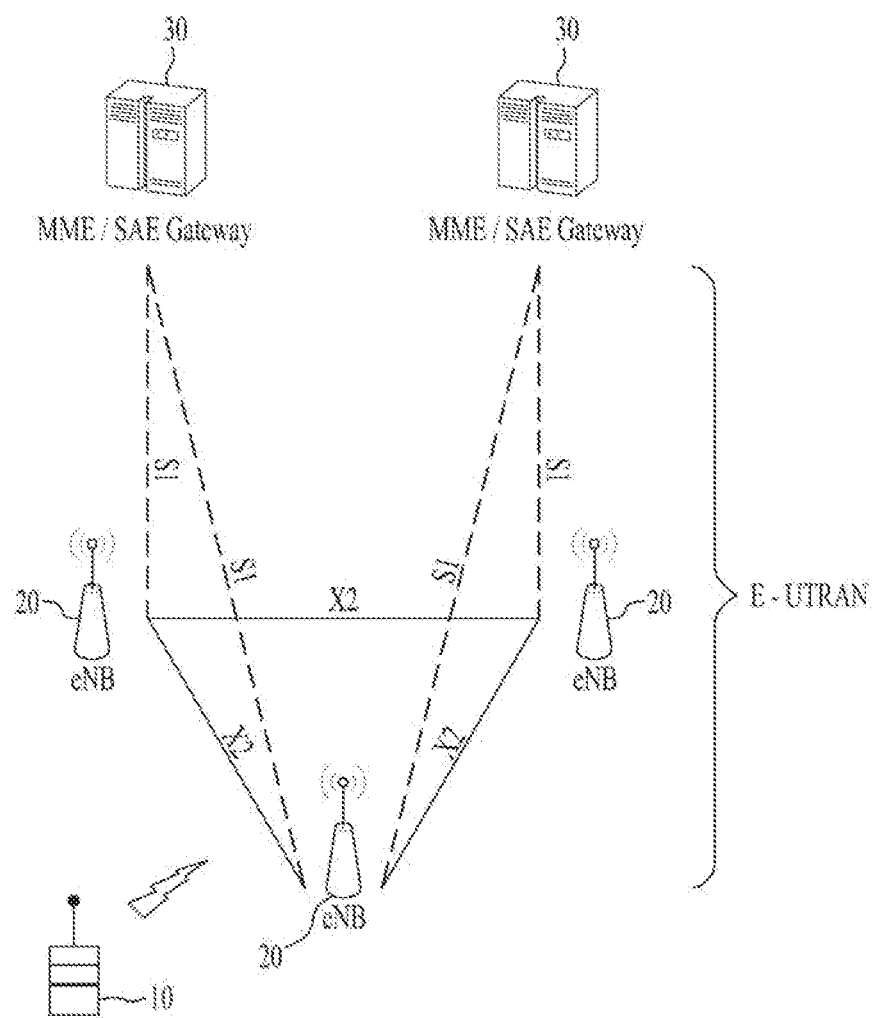

FIG. 3
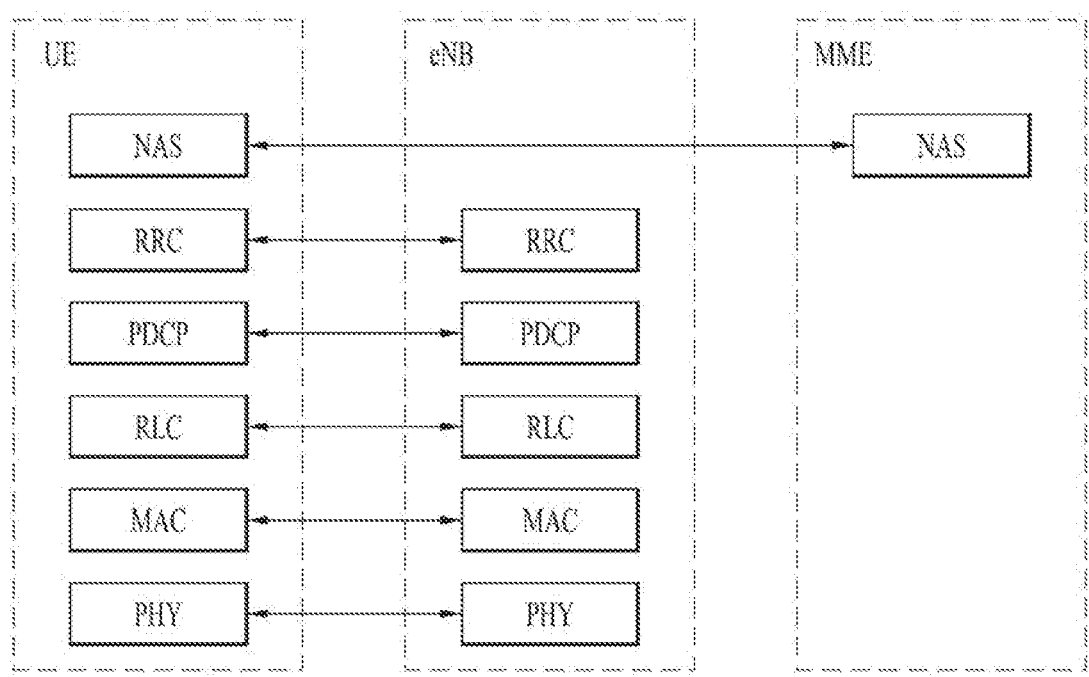
(a) Control-Plane Protocol Stack
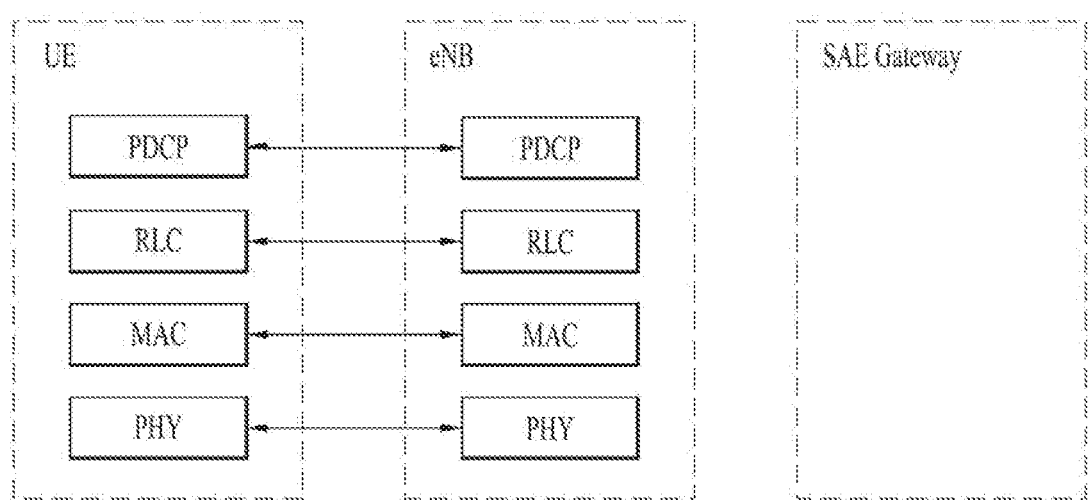
(b) User-Plane Protocol Stack (a) C-Plane connectivity of eNBs involved in dual connectivity (b) U-Plane connectivity of eNBs involved in dual connectivity

METHOD FOR TRIGGERING AND REPORTING A BUFFER STATUS AND DEVICE THEREFOR

CROSS-REFERENCE TO RELATED APPLICATIONS

This Application is a Continuation of co-pending U.S. patent application Ser. No. 15/986,277 filed on May 22, 2018, which is a Continuation of U.S. patent application Ser. No. 15/021,863 filed on Mar. 14, 2016 (now U.S. Pat. No. 10,064,090 issued on Aug. 28, 2018), which is the National Phase of PCT International Application No. PCT/KR2014/008741 filed on Sep. 19, 2014, which claims the priority benefit under 35 U.S.C. § 119(e) to U.S. Provisional Application No. 61/883,188 filed on Sep. 26, 2013, all of which are hereby expressly incorporated by reference into the present application.

BACKGROUND OF THE INVENTION

Field of the Invention

The present invention relates to a wireless communication system and, more particularly, to a method for triggering and reporting a buffer status and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

An object of the present invention devised to solve the problem lies in a method and device for a method for triggering and reporting a buffer status. The technical problems solved by the present invention are not limited to the above technical problems and those skilled in the art may understand other technical problems from the following description.

The object of the present invention can be achieved by providing a method for operating by an apparatus in wireless communication system, the method comprising; the method comprising: configuring a plurality of logical channel sets comprising a first logical channel set transmitting data to the first BS and a second logical channel set transmitting data to the second BS, wherein the first and the second logical channel sets respectively comprise one or more logical channels; receiving data for a first logical channel belonging to the first logical channel set; and triggering a buffer status reporting to the first BS, if the first logical channel has highest priority among logical channels for which data are available for transmission in the first logical channel set.

In another aspect of the present invention provided herein is an apparatus in the wireless communication system, the apparatus comprising: an RF (radio frequency) module; and a processor configured to control the RF module, wherein the processor is configured to configure a plurality of logical channel sets comprising a first logical channel set transmitting data to the first BS and a second logical channel set transmitting data to the second BS, wherein the first and the second logical channel sets respectively comprise one or more logical channels, to receive data for a first logical channel belonging to the first logical channel set, and to trigger a buffer status reporting to the first BS, if the first logical channel has highest priority among logical channels for which data are available for transmission in the first logical channel set.

Preferably, wherein the first logical channel has lower priority than a second logical channel belonging to the second logical channel set.

Preferably, the method further comprises: transmitting the buffer status reporting to the first BS when uplink data becomes available for transmission for the first BS.

Preferably, wherein the first logical channel set comprises one or more logical channel groups, and the first logical channel has highest priority among the logical channels which belong to one of the logical channel groups in the first logical channel set and for which the data are available for transmission.

It is to be understood that both the foregoing general description and the following detailed description of the present invention are exemplary and explanatory and are intended to provide further explanation of the invention as claimed.

According to the present invention, triggering and reporting a buffer status can be efficiently performed in a wireless communication system. Specifically, the UE can trigger and report each amount of data available for transmission to each base station in dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 2A is a block diagram illustrating network structure of an evolved universal mobile telecommunication system (E-UMTS)

FIG. 3 is a diagram showing a control plane and a user plane of a radio interface protocol between a UE and an E-UTRAN based on a 3rd generation partnership project (3GPP) radio access network standard;

DETAILED DESCRIPTION OF THE EMBODIMENTS

Figure 1:
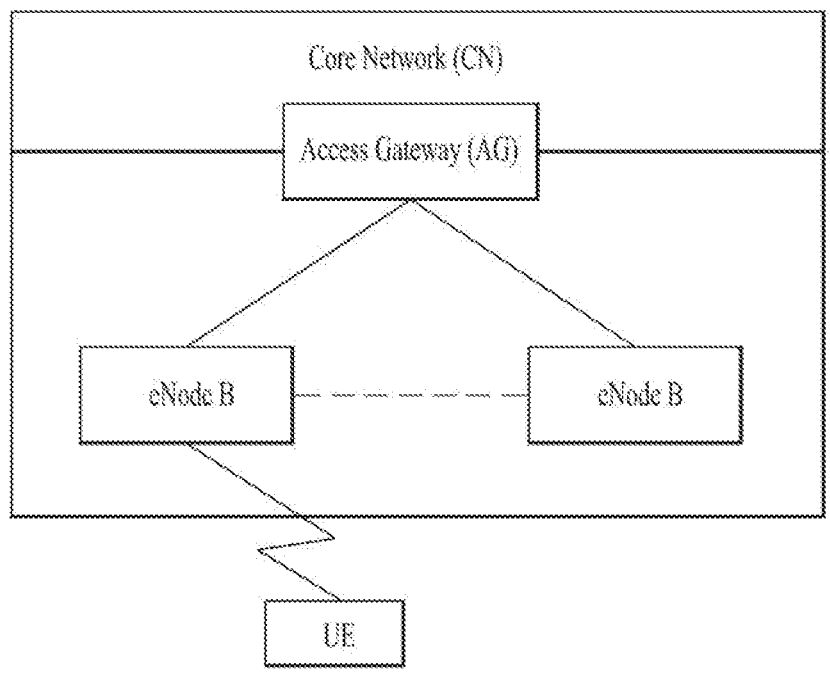
FIG. 1 is a diagram showing a network structure of an Evolved Universal Mobile Telecommunications System (E-UMTS) as an example of a wireless communication system.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
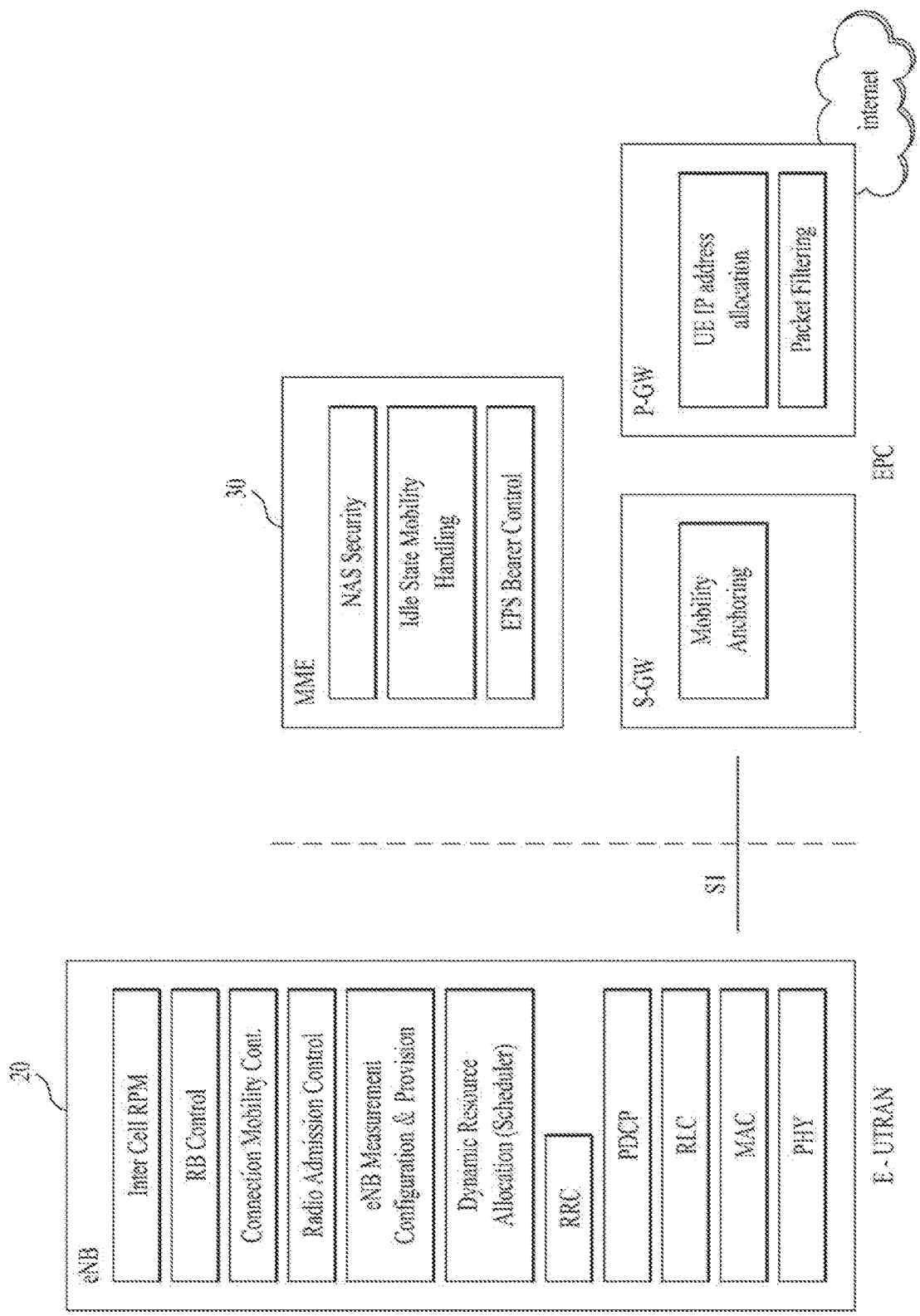
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
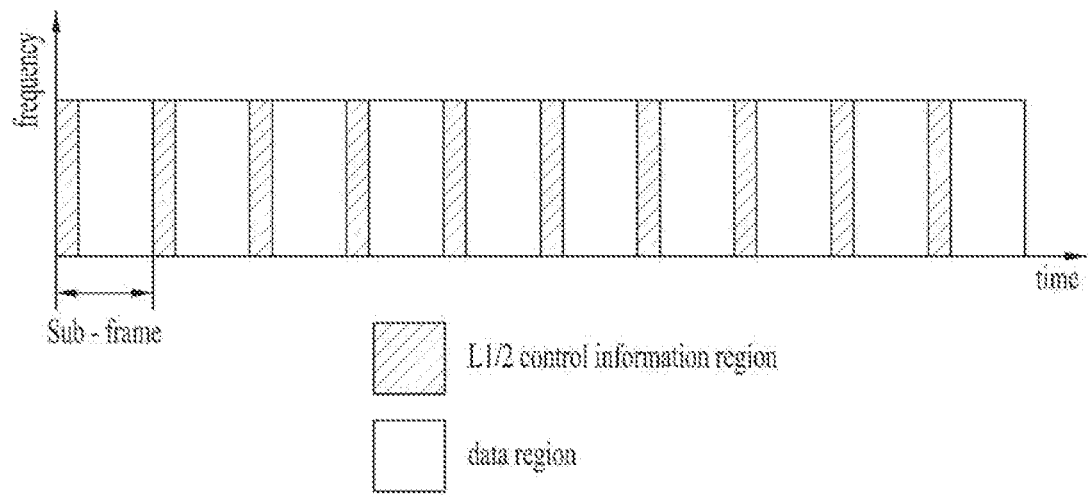
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
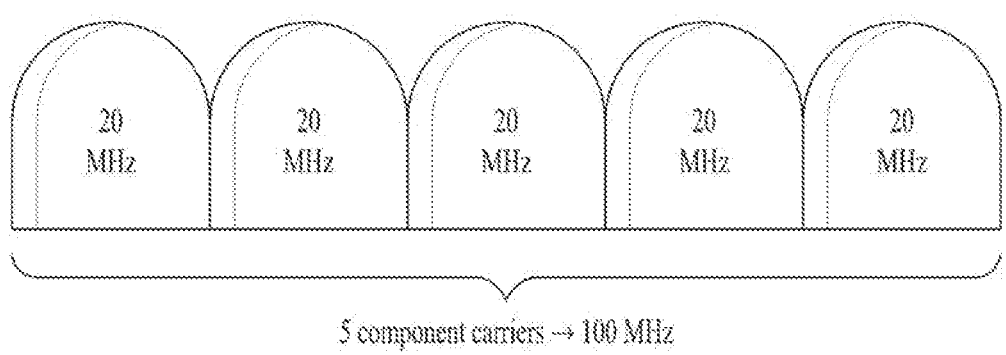
FIG. 5 is a diagram for carrier aggregation.

FIG. 5 is a diagram for carrier aggregation.

Carrier aggregation technology for supporting multiple carriers is described with reference to FIG. 5 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 6:
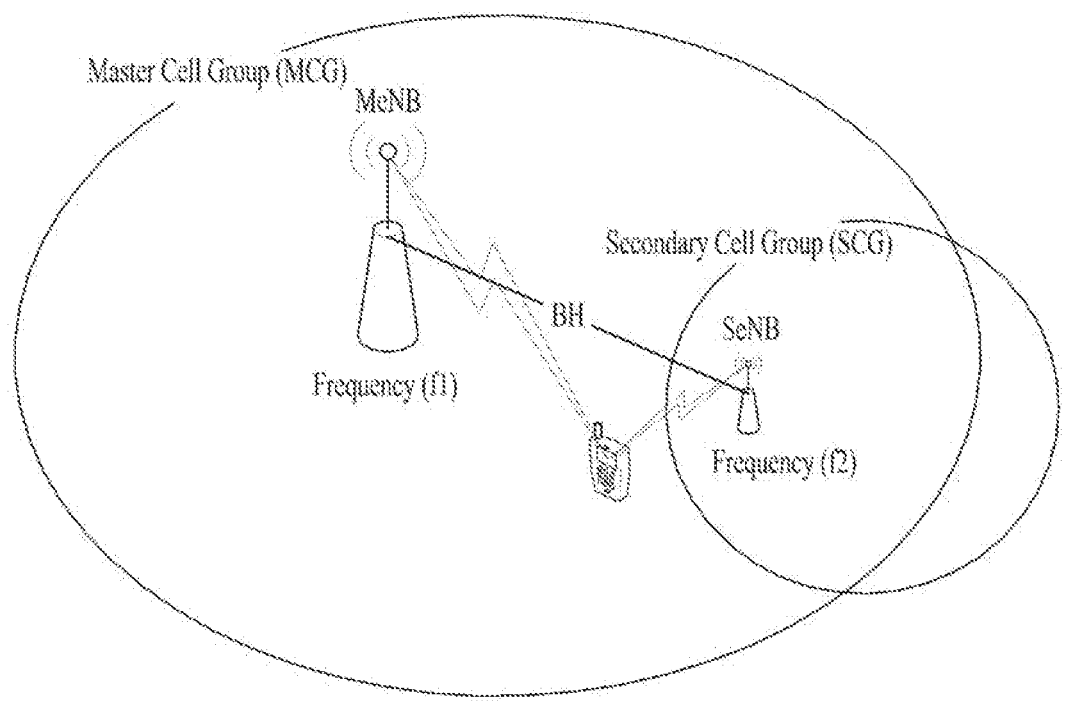
FIG. 6 is a conceptual diagram for dual connectivity between a Master Cell Group (MCG) and a Secondary Cell Group (SCG)

FIG. 6 is a conceptual diagram for dual connectivity (DC) between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 7A:
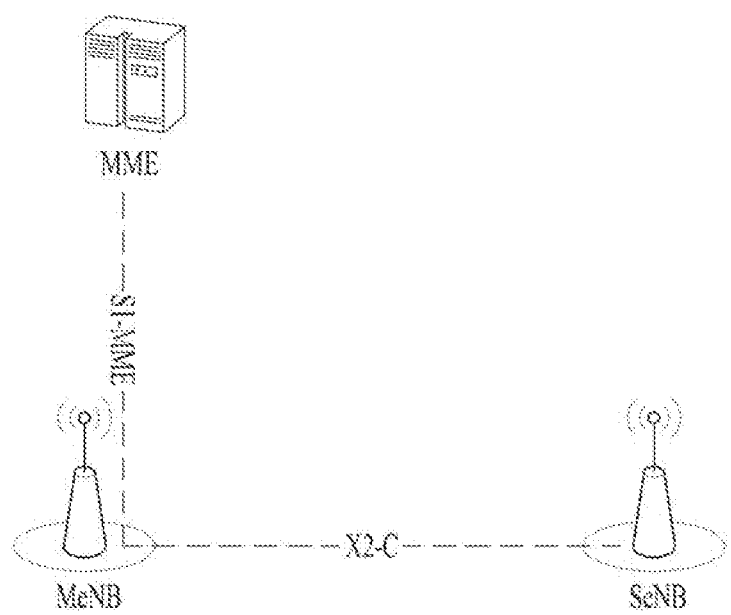
FIG. 7A is a conceptual diagram for C-Plane connectivity of base stations involved in dual connectivity.
Figure 7B:
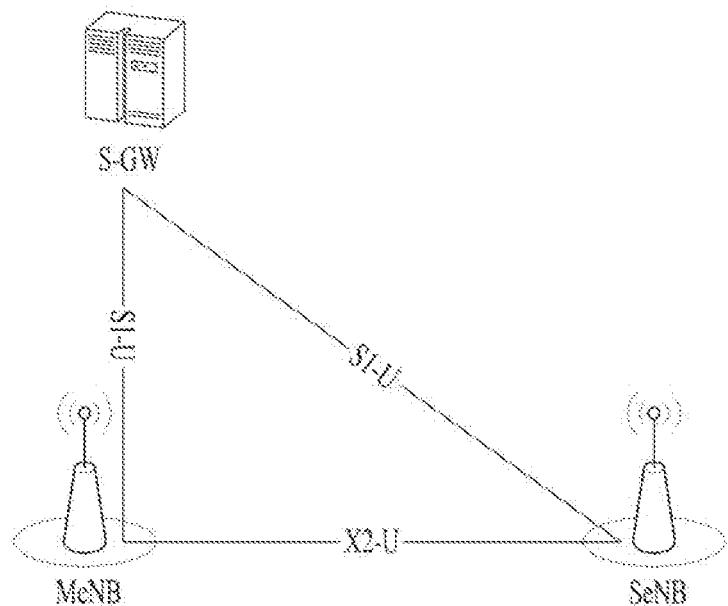
FIG. 7B is a conceptual diagram for U-Plane connectivity of base stations involved in dual connectivity.

FIG. 7a is a conceptual diagram for C-Plane connectivity of base stations involved in dual connectivity, and FIG. 7b is a conceptual diagram for U-Plane connectivity of base stations involved in dual connectivity.

FIG. 7a shows C-plane (Control Plane) connectivity of eNBs involved in dual connectivity for a certain UE. The MeNB is C-plane connected to the MME via S1-MME, the MeNB and the SeNB are interconnected via X2-C (X2-Control plane). As FIG. 7a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

FIG. 7b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 8:
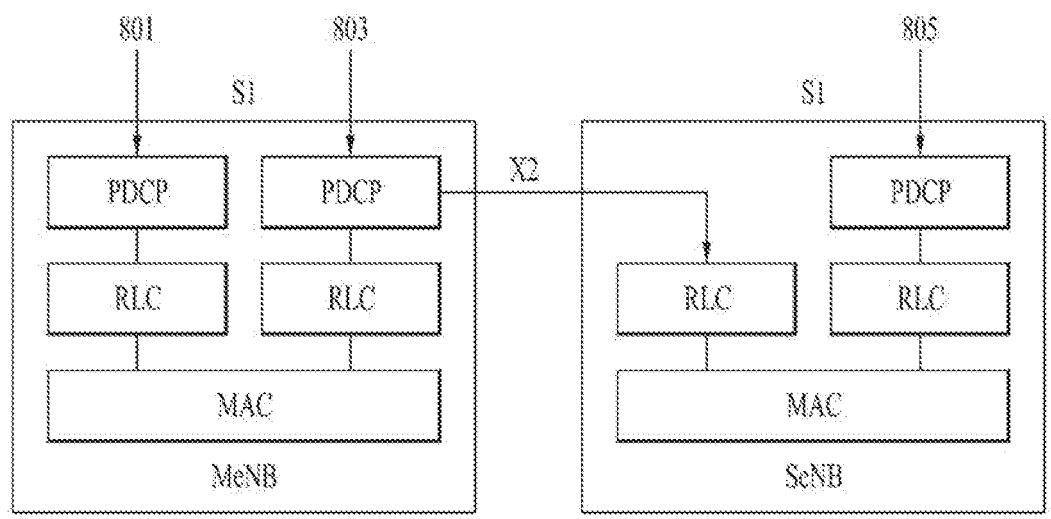
FIG. 8 is a conceptual diagram for radio protocol architecture for dual connectivity.

FIG. 8 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (801), split bearer (803) and SCG bearer (805). Those three alternatives are depicted on FIG. 8. The SRBs (Signaling Radio Bearers) are always of the MCG bearer and therefore only use the radio resources provided by the MeNB. The MCG bearer (801) is a radio protocol only located in the MeNB to use MeNB resources only in the dual connectivity. And the SCG bearer (805) is a radio protocol only located in the SeNB to use SeNB resources in the dual connectivity.

Specially, the split bearer (803) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 9:
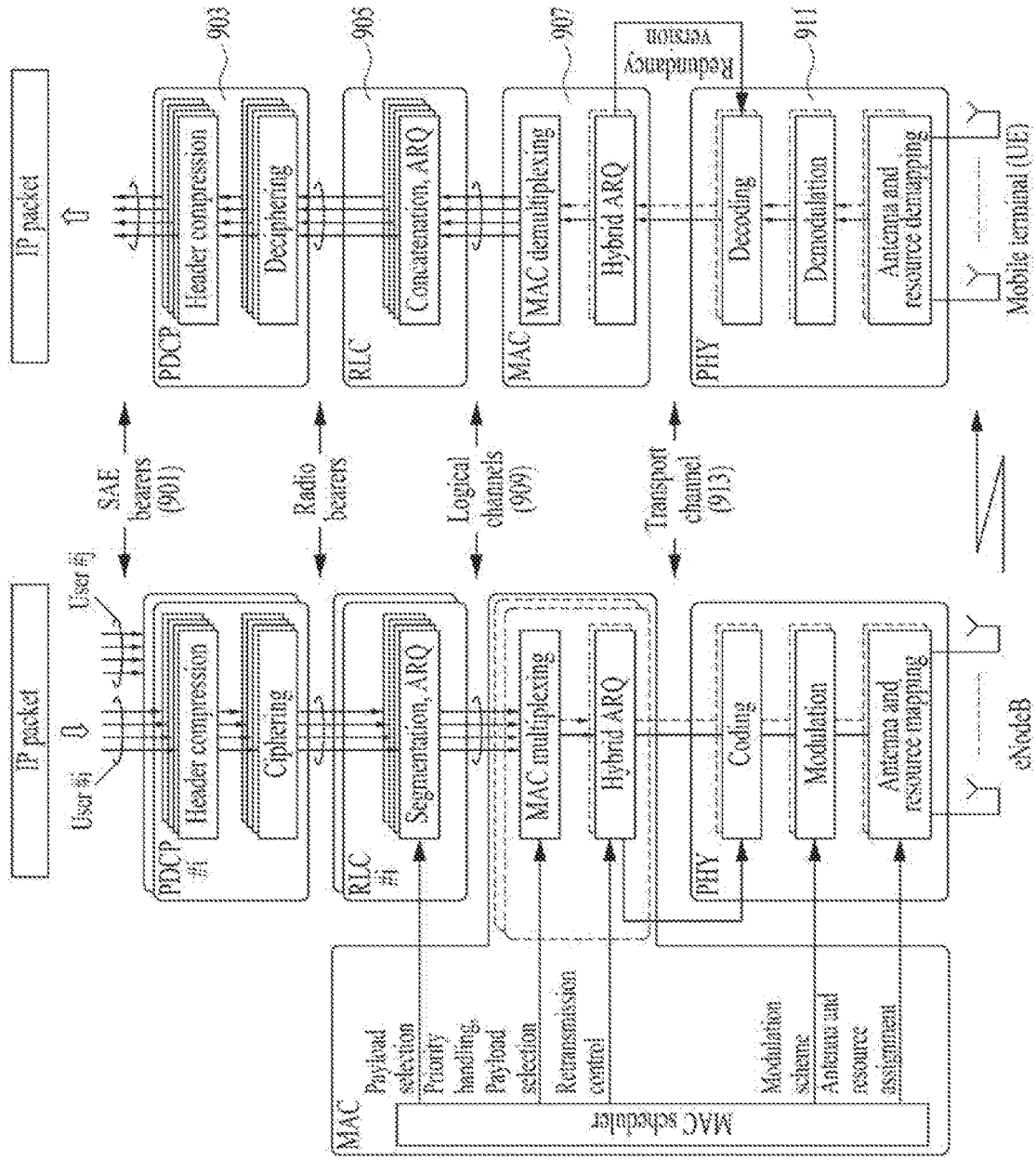
FIG. 9 is a diagram for a general overview of the LTE protocol architecture for the downlink.

FIG. 9 is a diagram for a general overview of the LTE protocol architecture for the downlink.

A general overview of the LTE protocol architecture for the downlink is illustrated in FIG. 9. Furthermore, the LTE protocol structure related to uplink transmissions is similar to the downlink structure in FIG. 9, although there are differences with respect to transport format selection and multi-antenna transmission.

Data to be transmitted in the downlink enters in the form of IP packets on one of the SAE bearers (901). Prior to transmission over the radio interface, incoming IP packets are passed through multiple protocol entities, summarized below and described in more detail in the following sections:

Packet Data Convergence Protocol (PDCP, 903) performs IP header compression to reduce the number of bits necessary to transmit over the radio interface. The header-compression mechanism is based on ROHC, a standardized header-compression algorithm used in WCDMA as well as several other mobile-communication standards. PDCP (903) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 905) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (905) offers services to the PDCP (903) in the form of radio bearers. There is one RLC entity per radio bearer configured for a terminal.

Medium Access Control (MAC, 907) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (907) offers services to the RLC (905) in the form of logical channels (909).

Physical Layer (PHY, 911), handles coding/decoding, modulation/demodulation, multi-antenna mapping, and other typical physical layer functions. The physical layer (911) offers services to the MAC layer (907) in the form of transport channels (913).

The MAC (907) offers services to the RLC (905) in the form of logical channels (909). A logical channel (909) is defined by the type of information it carries and are generally classified into control channels, used for transmission of control and configuration information necessary for operating an LTE system, and traffic channels, used for the user data.

The set of logical-channel types specified for LTE includes:

Broadcast Control Channel (BCCH), used for transmission of system control information from the network to all mobile terminals in a cell. Prior to accessing the system, a mobile terminal needs to read the information transmitted on the BCCH to find out how the system is configured, for example the bandwidth of the system.

Paging Control Channel (PCCH), used for paging of mobile terminals whose location on cell level is not known to the network and the paging message therefore needs to be transmitted in multiple cells.

Dedicated Control Channel (DCCH), used for transmission of control information to/from a mobile terminal. This channel is used for individual configuration of mobile terminals such as different handover messages.

Multicast Control Channel (MCCH), used for transmission of control information required for reception of the MTCH.

Dedicated Traffic Channel (DTCH), used for transmission of user data to/from a mobile terminal. This is the logical channel type used for transmission of all uplink and non-MBMS downlink user data.

Multicast Traffic Channel (MTCH), used for downlink transmission of MBMS services.

Figure 10:
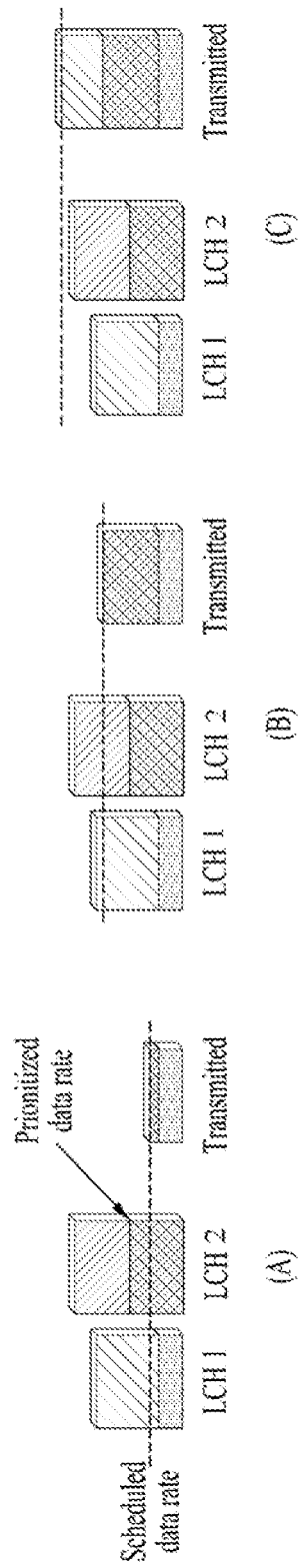
FIG. 10 is a diagram for prioritization of two logical channels for three different uplink grants.

FIG. 10 is a diagram for prioritization of two logical channels for three different uplink grants.

Multiple logical channels of different priorities can be multiplexed into the same transport block using the same MAC multiplexing functionality as in the downlink. However, unlike the downlink case, where the prioritization is under control of the scheduler and up to the implementation, the uplink multiplexing is done according to a set of well-defined rules in the terminal as a scheduling grant applies to a specific uplink carrier of a terminal, not to a specific radio bearer within the terminal. Using radio-bearer-specific scheduling grants would increase the control signaling overhead in the downlink and hence per-terminal scheduling is used in LTE.

The simplest multiplexing rule would be to serve logical channels in strict priority order. However, this may result in starvation of lower-priority channels; all resources would be given to the high-priority channel until its transmission buffer is empty. Typically, an operator would instead like to provide at least some throughput for low-priority services as well. Therefore, for each logical channel in an LTE terminal, a prioritized data rate is configured in addition to the priority value. The logical channels are then served in decreasing priority order up to their prioritized data rate, which avoids starvation as long as the scheduled data rate is at least as large as the sum of the prioritized data rates. Beyond the prioritized data rates, channels are served in strict priority order until the grant is fully exploited or the buffer is empty. This is illustrated in FIG. 10.

Regarding FIG. 10, it may be assumed that a priority of the logical channel 1 (LCH 1) is higher than a priority of the logical channel 2 (LCH 2). In case of (A), all prioritized data of the LCH 1 can be transmitted and a portion of prioritized data of the LCH 2 can be transmitted until amount of the scheduled data rate. In case of (B), all prioritized data of the LCH 1 and all prioritized data of the LCH 2 can be transmitted. In case of (C) all prioritized data of the LCH 1 and all prioritized data of the LCH 2 can be transmitted and a portion of data of the LCH 1 can be further transmitted.

Figure 11:
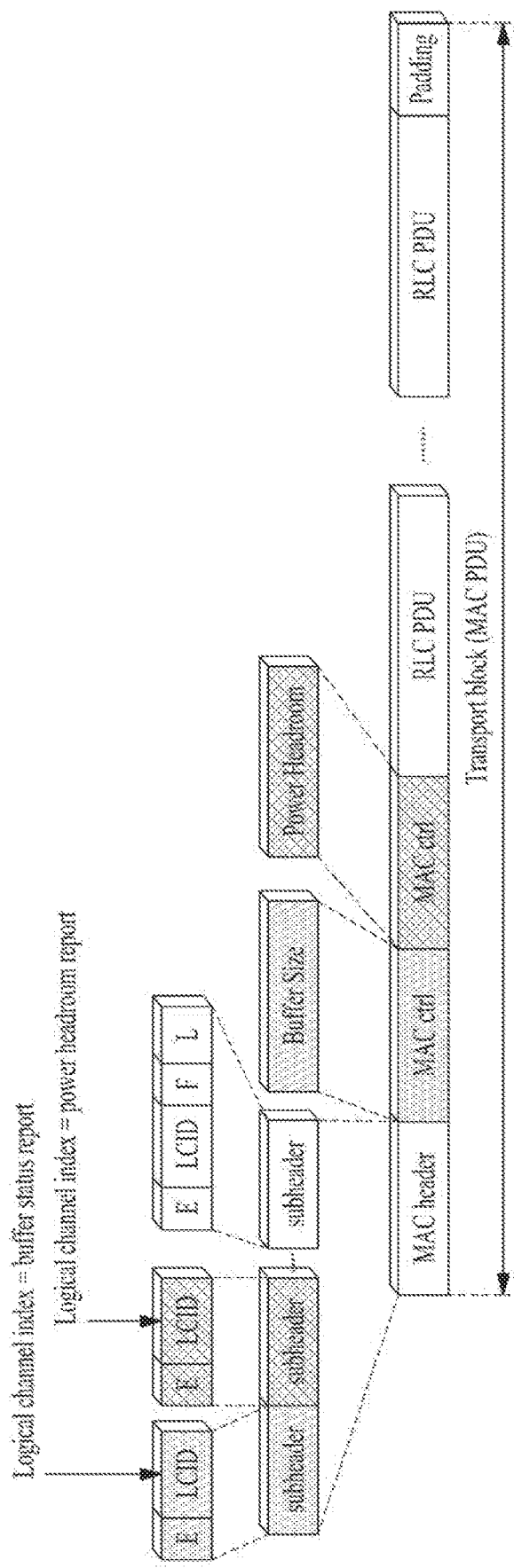
FIG. 11 is a diagram for signaling of buffer status and power-headroom reports.

FIG. 11 is a diagram for signaling of buffer status and power-headroom reports.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

The use of a single bit for the scheduling request is motivated by the desire to keep the uplink overhead small, as a multi-bit scheduling request would come at a higher cost. A consequence of the single bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 11.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group. A buffer status report represents one or all four logical-channel groups and can be triggered for the following reasons:

i) Arrival of data with higher priority than currently in the transmission buffer—that is, data in a logical-channel group with higher priority than the one currently being transmitted—as this may impact the scheduling decision.

ii) Change of serving cell, in which case a buffer-status report is useful to provide the new serving cell with information about the situation in the terminal.

iii) Periodically as controlled by a timer.

iv) Instead of padding. If the amount of padding required to match the scheduled transport block size is larger than a buffer-status report, a buffer-status report is inserted. Clearly it is better to exploit the available payload for useful scheduling information instead of padding if possible.

Data Available for Transmission in a PDCP Entity

For the purpose of MAC buffer status reporting, the UE shall consider PDCP Control PDUs, as well as the following as data available for transmission in the PDCP entity:

For SDUs for which no PDU has been submitted to lower layers: i) the SDU itself, if the SDU has not yet been processed by PDCP, or ii) the PDU if the SDU has been processed by PDCP.

In addition, for radio bearers that are mapped on RLC AM, if the PDCP entity has previously performed the re-establishment procedure, the UE shall also consider the following as data available for transmission in the PDCP entity:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received: i) the SDU, if it has not yet been processed by PDCP, or ii) the PDU once it has been processed by PDCP.

Data Available for Transmission in a RLC Entity

For the purpose of MAC buffer status reporting, the UE shall consider the following as data available for transmission in the entity: i) RLC SDUs, or segments thereof, that have not yet been included in an RLC data PDU, ii) RLC data PDUs, or portions thereof, that are pending for retransmission (RLC AM).

In addition, if a STATUS PDU has been triggered and t-StatusProhibit is not running or has expired, the UE shall estimate the size of the STATUS PDU that will be transmitted in the next transmission opportunity, and consider this as data available for transmission in the RLC layer.

Buffer Status Reporting (BSR)

The Buffer Status Reporting (BSR) procedure is used to provide a serving eNB with information about the amount of data available for transmission (DAT) in the UL buffers of the UE. RRC may control BSR reporting by configuring the two timers periodicBSR-Timer and retxBSR-Timer and by, for each logical channel, optionally signaling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

Figure 12:
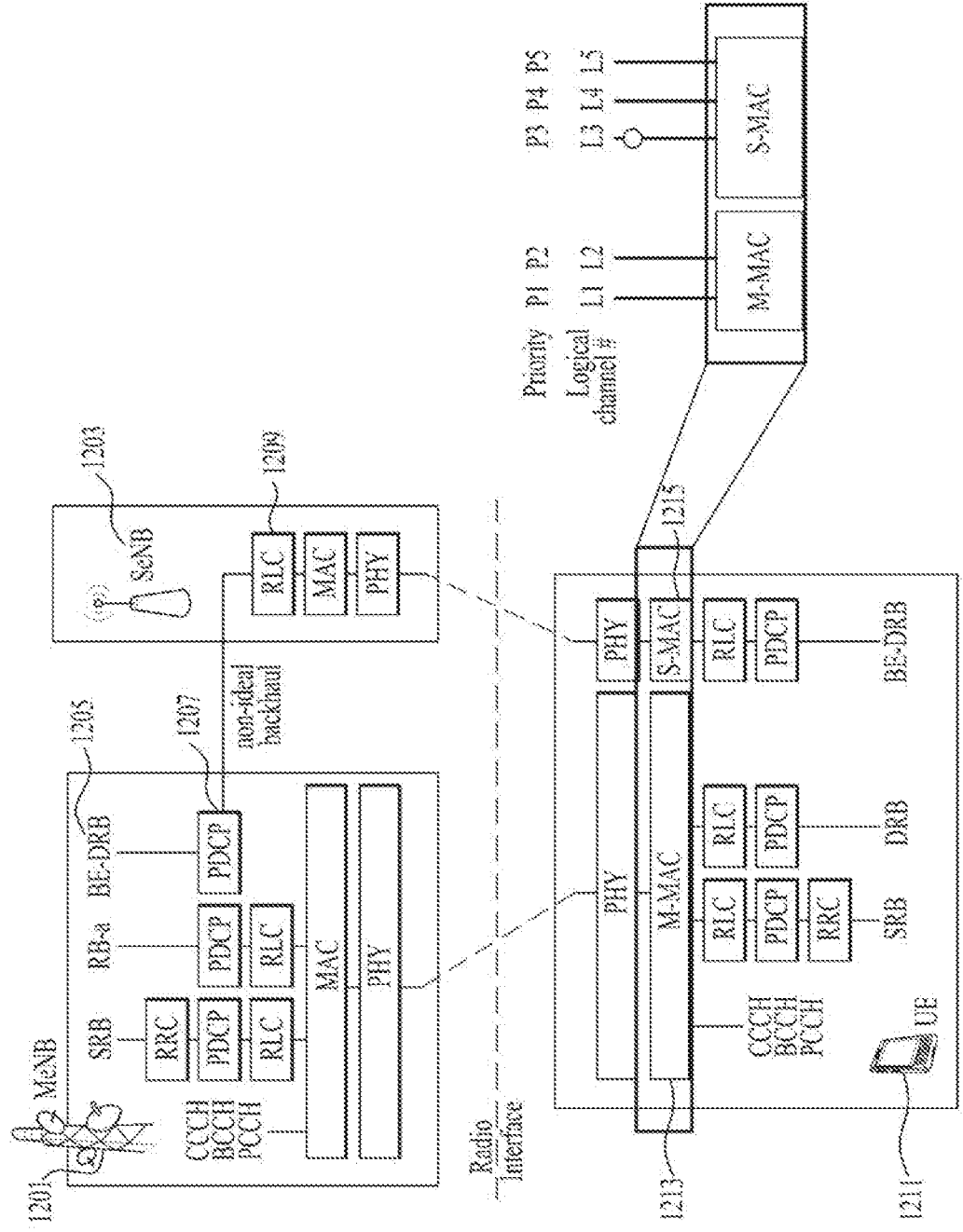
FIG. 12 is a conceptual diagram for one of radio protocol architecture for dual connectivity.

FIG. 12 is a conceptual diagram for one of radio protocol architecture for dual connectivity.

The UE may transmit Buffer Status Report (BSR) to a base station to assist the base station in allocating the uplink radio resources to the different UEs by indicating the amount of data buffered across the UE's PDCP and RLC memory. The BSR shall be triggered by the timers and the events as described in the above Prior Art. For example, there are timers, i.e., retxBSR-Timer and periodicBSR-Timer, which triggers BSR upon timer expiry.

However, in LTE Rel-12, a new study on dual connectivity, i.e. UE is connected to both MeNB (1201) and SeNB (1203), as shown in FIG. 12. In this figure, the interface between MeNB (1201) and SeNB (1203) is called Xn interface (1205). The Xn interface (1205) is assumed to be non-ideal; i.e. the delay in Xn interface could be up to 60 ms, but it is not limited thereto.

The SeNB (1203) is responsible for transmitting best effort (BE) type traffic, while the MeNB (1201) is responsible for transmitting other types of traffic such as VoIP, streaming data, or signaling data. To support dual connectivity, various protocol architectures are studied, and one of potential architectures is shown in FIG. 12. In this architecture, PDCP (1207) and RLC (1209) entities are located in different network nodes, i.e. PDCP in MeNB and RLC in SeNB.

In the UE side (1211), the protocol architecture is same as prior art except that the MAC entity is commonly setup but there are sub entity for each eNB. That is M-MAC for MeNB (1213) and S-MAC for SeNB (1215). This is because the scheduling nodes are located in different nodes and two nodes are linked with non-ideal backhaul. In dual connectivity, each logical channel is mapped to M-MAC and S-MAC, respectively.

In this case, this structure mentioned above (i.e., M-MAC and S-MAC) can be caused several problems.

First of all, there can be a case that a logical channel with higher priority than other logical channels within one MAC entity is not the logical channel with higher priority within the common MAC entity. For example, assume that there are five logical channels L1, L2, L3, L4 and L5 having the priority with decreasing order, i.e., L1 is having the highest priority and L5 is having the lowest priority among five logical channels. If L1 and L2 are mapped to the M-MAC (1213) while L3, L4 and L5 are mapped to the S-MAC (1215), L3 has a higher priority than any other logical channels mapped to the S-MAC (1215), but L3 is not the logical channel with the highest priority within UE.

In the previous art, the BSR is triggered in any of the following situation:

i) when data arrive for a logical channel which has higher priority than the logical channels whose buffers are not empty;

ii) when data become available for the UE's buffer, which is empty;

iii) when the retxBSR-Timer expires and there is still data in the UE's buffer;

iv) when a periodicBSR-Timer expires; or v) when the remaining space in a MAC PDU can accommodate a BSR.

Considering that the BSR function is performed commonly in the UE, if data arrive for the logical channel L3 while the buffer for the logical channel L1 is not empty, then the BSR would not be triggered. However, in dual connectivity, since the UL scheduling is performed in the different eNBs, MeNB and SeNB, it requires a mechanism to trigger the BSR by comparing the priority of the logical channels among the logical channels served by the same servings.

And another problem is that it is not clear in the previous art to which eNB the regular BSR is transmitted, when a Regular BSR is triggered in one MAC entity: is the regular BSR transmitted to MeNB or SeNB.

Figure 13:
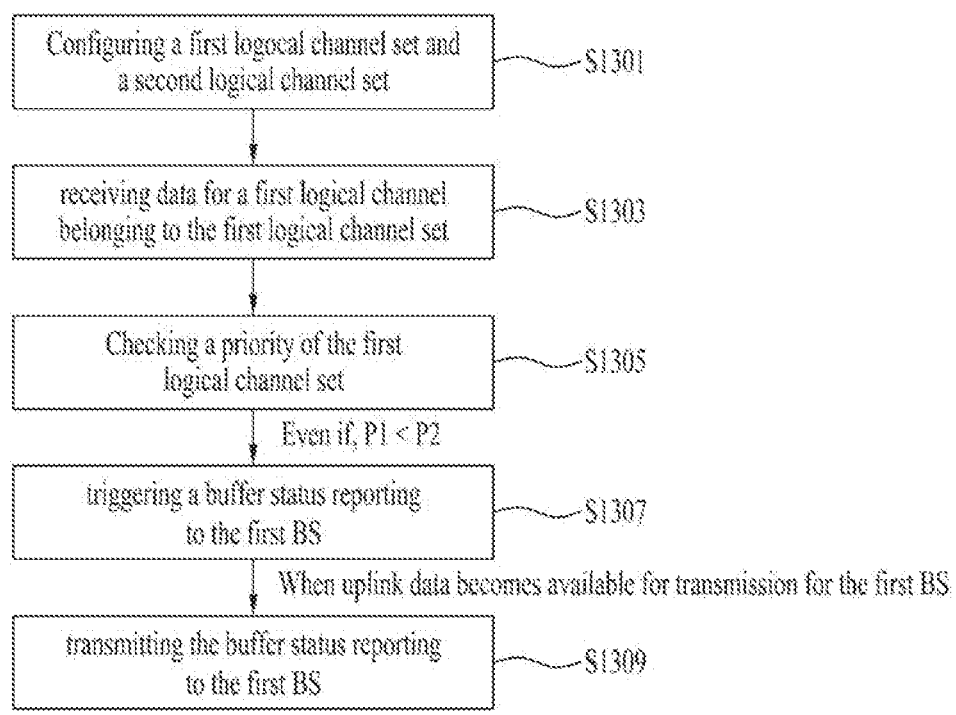
FIGS. 13 and 14 are examples of triggering and reporting buffer status for each base station according to embodiments of the present invention.

FIG. 13 is a conceptual diagram for triggering and reporting buffer status for each base station according to embodiments of the present invention.

In a UE, there are two MAC entities, i.e., M-MAC and S-MAC. The M-MAC is responsible for transmission between the UE and the MeNB and the S-MAC is responsible for transmission between the UE and the SeNB.

The dual connectivity means that the UE can be connected to both a first base station and a second base station at the same time. The first base station may be a Master eNode-B (MeNB) and the second base station may be a Secondary eNode-B (SeNB), and vice versa.

The logical channels for the MCG are mapped to the M-MAC and the logical channels for the SCG are mapped to the S-MAC. A MCG is a group of serving cells associated with the MeNB, comprising of a PCell and optionally one or more SCells. And a SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface between the MeNB and the SeNB is non-ideal, which means that there is considerable delay in the backhaul and therefore the centralized scheduling in one node is not possible.

The functions of different MAC entities in the UE operate independently if not otherwise specified. Radio bearers are mapped to MCG and/or SCG with RRC signaling. The logical channel identities are allocated independently per CG. LCGs are defined per MAC entity.

The UE can configure a plurality of logical channel sets comprising one or more logical channels, wherein the plurality of logical channel sets comprise a first logical channel set transmitting data to the first BS and a second logical channel set transmitting data to the second BS (S1301).

Preferably, the first logical channel set comprises one or more logical channel groups, and the one or more logical channel groups may be mapped to the M-MAC. And the second logical channel set comprises one or more logical channel groups, and the one or more logical channel groups may be mapped to the S-MAC.

When data for a first logical channel belonging to the first logical channel set is received (S1303), the UE can check a priority of the first logical channel set (S1305).

Preferably, the UE can trigger a Regular BSR if all of the following events occurs (S1307):

i) Uplink data, for a first logical channel which belongs to the one or more logical channel groups mapped to the M-MAC, becomes available for transmission in the corresponding RLC entity or in the corresponding PDCP entity; and ii) Predefine trigger criterion is satisfied.

That means, when uplink data, for a first logical channel which belongs to the one or more logical channel groups mapped to the M-MAC, becomes available for transmission in the corresponding RLC entity or in the corresponding PDCP entity, the MAC entity which are mapped to the first logical channel checks whether the predefine trigger criterion is satisfied or not.

Preferably, the predefine trigger criterion can be satisfied, if the first logical channel has lower priority than a second logical channel belonging to the second logical channel set and the first logical channel has highest priority among the first logical channel set.

That means, the first logical channel, which belongs to the one or more logical channel groups mapped to the M-MAC entity and to which UL data becomes available for transmission, has higher priority than the priorities of other logical channels, which belong to any one or more logical channel groups that are mapped to the same MAC entity and for which data are already available for transmission. It is noted that for the predefine trigger criterion, the priorities of the logical channels are compared among the logical channels which belong to any logical channel groups that are mapped to the same MAC entity.

After the step of S1307, when the buffer status reporting is triggered to the first BS and uplink data becomes available for transmission for the first BS, the UE can transmit the buffer status reporting to the first BS. Or, when the buffer status reporting is triggered to the second BS and uplink data becomes available for transmission for the second BS, the UE can transmit the buffer status reporting to the second BS (S1309).

If uplink data becomes available for transmission in a RLC entity or in a PDCP entity, the UE can check that among MeNB and SeNB, to which eNB the UE should transmit the uplink data.

If the data is checked to be transmitted to the MeNB, the UE triggers a regular BSR in M-MAC. And else if the data is checked to be transmitted to the SeNB, the UE triggers a regular BSR in S-MAC.

The MAC entity, which triggers the Regular BSR, transmits the Regular BSR to the corresponding eNB.

If M-MAC triggers the regular BSR, M-MAC transmits the regular BSR to the MeNB. And else if S-MAC triggers the regular BSR, S-MAC transmits the regular BSR to the SeNB.

For the Buffer Status reporting procedure, the UE shall consider all radio bearers mapped to this MAC entity which are not suspended and may consider radio bearers which are suspended.

Figure 14:
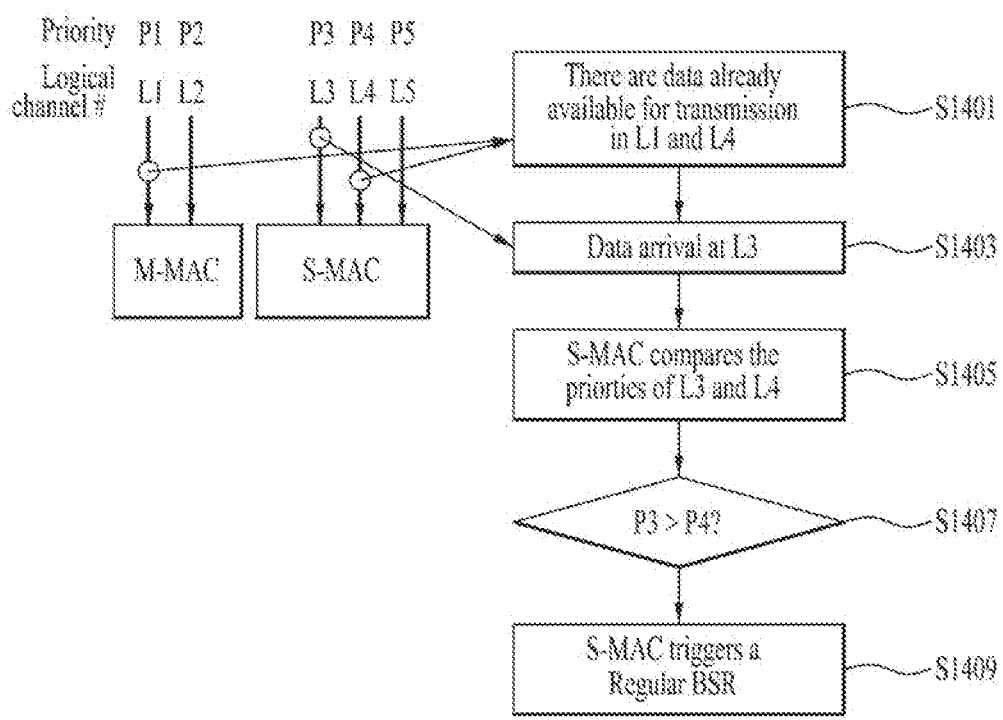

FIG. 14 is a conceptual diagram for triggering and reporting buffer status for each base station according to embodiments of the present invention.

The network configures the UE with two MAC entities, i.e., M-MAC and S-MAC. The UE may be configured by the network with five logical channels, L1, L2, L3, L4, and L5 with the priorities of P1, P2, P3, P4, and P5 in a decreasing order, i.e., (high) P1>P2>P3>P4>P5 (low).

Among the five logical channels, L1 and L2 are mapped to M-MAC, and L3, L4, and L5 are mapped to the S-MAC. For L1 and L4, there are data already available for transmission (S1401).

UL data becomes available for transmission through the logical channel L3 (S1403).

Since the logical channel L3 is mapped to S-MAC, S-MAC checks whether the predefine trigger criterion is satisfied or not: S-MAC compares the priority of logical channel L3, i.e., P3, to the priority of the logical channel L4, i.e., P4 because L4 is mapped to S-MAC and data are already available for transmission for L4. Since the logical channel L5 has no data available for transmission, S-MAC does not compare P3 to P5 although they are both mapped to the same S-MAC (S1405).

Since P3 is higher priority than P4 (S1407), the UE considers that the predefine trigger criterion is satisfied. The UE triggers a Regular BSR (S1409).

Figure 15:
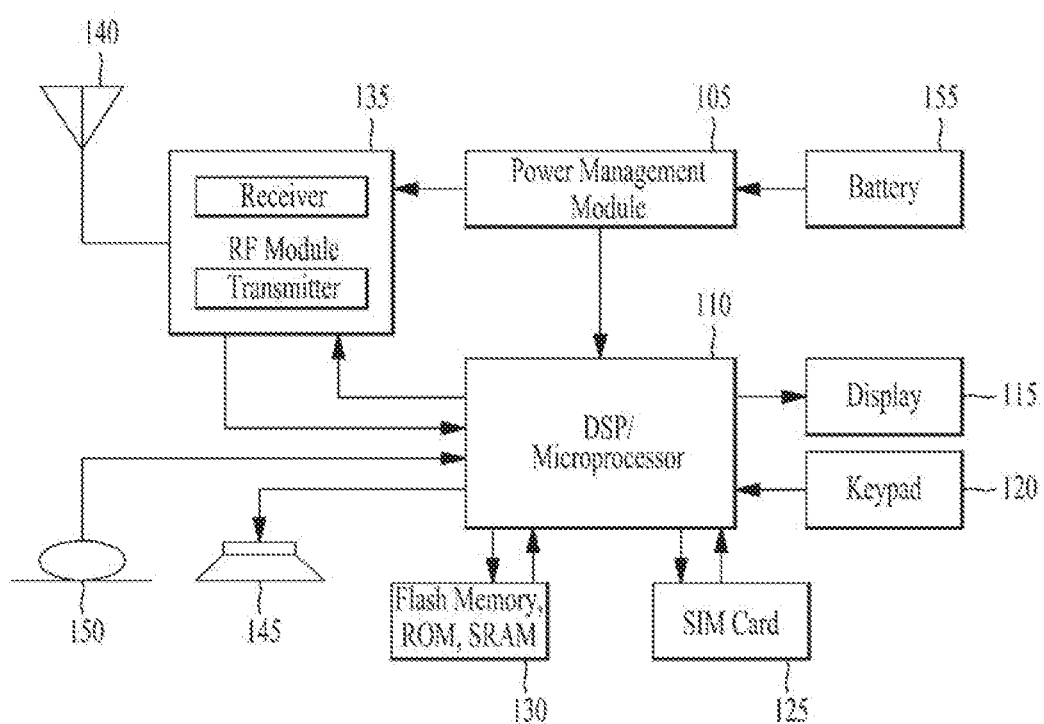
FIG. 15 is a block diagram of a communication apparatus according to an embodiment of the present invention.

FIG. 15 is a block diagram of a communication apparatus according to an embodiment of the present invention.

The apparatus shown in FIG. 15 can be a user equipment (UE) and/or eNB adapted to perform the above mechanism, but it can be any apparatus for performing the same operation.

As shown in FIG. 15, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 15 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 15 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the above-described method has been described centering on an example applied to the 3GPP LTE system, the present invention is applicable to a variety of wireless communication systems in addition to the 3GPP LTE system.

What is claimed is:

1. A method for triggering a buffer status report (BSR) by a user equipment (UE) in a wireless communication system comprising a first base station (BS) and a second BS, the method comprising:
    configuring a first medium access control (MAC) entity and a second MAC entity, wherein at least one first logical channel group (LCG) including one or more logical channels is mapped to the first MAC entity, and wherein at least one second LCG including one or more logical channels is mapped to the second MAC entity; and
    triggering the BSR based on uplink data becoming available for a logical channel that (i) belongs to a respective one of the at least one first or second LCG mapped to one of the first MAC entity and the second MAC entity, and that (ii) has a priority higher than a priority of any logical channel that contains already available uplink data and that belongs to any of the respective one of the at least one first or second LCG mapped to the same one of the first MAC entity and the second MAC entity,
    wherein the BSR is triggered in the one of the first MAC entity and the second MAC entity, independently of logical channels of the LCG in the other of the first MAC entity and the second MAC entity.

2. The method of claim 1, wherein the first MAC entity is for the first BS, and the second MAC entity is for the second BS.

3. The method of claim 2, wherein first BS belongs to a macro cell and the second BS belongs to a small cell.

4. The method of claim 1, wherein based on the uplink data becoming available for the logical channel that belongs to the at least one second LCG mapped to the second MAC entity:
- first uplink data is already available on a first logical channel that belongs to the at least one first LCG mapped to the first MAC entity,
- second uplink data is already available on a second logical channel that belongs to the at least one second LCG mapped to the second MAC entity, and
- triggering the BSR is based on the logical channel on which the uplink data becomes available having higher priority than the second logical channel that belongs to the at least one second LCG mapped to the second MAC entity.

5. At least one computer memory operably connectable to at least one processor of a user equipment (UE) in a wireless communication system including a first base station (BS) and a second BS, the at least one computer memory storing instructions that, when executed by the at least one processor, perform operations comprising:
- configuring a first medium access control (MAC) entity and a second MAC entity, wherein at least one first logical channel group (LCG) including one or more logical channels is mapped to the first MAC entity, and wherein at least one second LCG including one or more logical channels is mapped to the second MAC entity; and
- triggering a buffer status report (BSR) based on uplink data becoming available for a logical channel that (i) belongs to a respective one of the at least one first or second LCG mapped to one of the first MAC entity and the second MAC entity, and that (ii) has a priority higher than a priority of any logical channel that contains already available uplink data and that belongs to any of the respective one of the at least one first or second LCG mapped to the same one of the first MAC entity and the second MAC entity,
- wherein the BSR is triggered in the one of the first MAC entity and the second MAC entity, independently of logical channels of the LCG in the other of the first MAC entity and the second MAC entity.

6. The at least one computer memory of claim 5, wherein the first MAC entity is for the first BS, and the second MAC entity is for the second BS.

7. The at least one computer memory of claim 6, wherein first BS belongs to a macro cell and the second BS belongs to a small cell.

8. The at least one computer memory of claim 5, wherein based on the uplink data becoming available for the logical channel that belongs to the at least one second LCG mapped to the second MAC entity:
- first uplink data is already available on a first logical channel that belongs to the at least one first LCG mapped to the first MAC entity,
- second uplink data is already available on a second logical channel that belongs to the at least one second LCG mapped to the second MAC entity, and
- triggering the BSR is based on the logical channel on which the uplink data becomes available having higher priority than the second logical channel that belongs to the at least one second LCG mapped to the second MAC entity.

9. A user equipment (UE) configured to operate in a wireless communication system including a first base station (BS) and a second BS, the UE comprising:
- a transceiver;
- at least one processor; and at least one computer memory operably connectable to the at least one processor and storing instructions that, when executed by the at least one processor, perform operations comprising:
- configuring a first medium access control (MAC) entity and a second MAC entity, wherein at least one first logical channel group (LCG) including one or more logical channels is mapped to the first MAC entity, and wherein at least one second LCG including one or more logical channels is mapped to the second MAC entity; and
- triggering a buffer status report (BSR) based on uplink data becoming available for a logical channel that (i) belongs to a respective one of the at least one first or second LCG mapped to one of the first MAC entity and the second MAC entity, and that (ii) has a priority higher than a priority of any logical channel that contains already available uplink data and that belongs to any of the respective one of the at least one first or second LCG mapped to the same one of the first MAC entity and the second MAC entity,
- wherein the BSR is triggered in the one of the first MAC entity and the second MAC entity, independently of logical channels of the LCG in the other of the first MAC entity and the second MAC entity.

10. The UE of claim 9, wherein the first MAC entity is for the first BS, and the second MAC entity is for the second BS.

11. The UE of claim 10, wherein first BS belongs to a macro cell and the second BS belongs to a small cell.

12. The UE of claim 9, wherein based on the uplink data becoming available for the logical channel that belongs to the at least one second LCG mapped to the second MAC entity:
- first uplink data is already available on a first logical channel that belongs to the at least one first LCG mapped to the first MAC entity,
- second uplink data is already available on a second logical channel that belongs to the at least one second LCG mapped to the second MAC entity, and
- triggering the BSR is based on the logical channel on which the uplink data becomes available having higher priority than the second logical channel that belongs to the at least one second LCG mapped to the second MAC entity.

\* \* \* \* \*